(12) United States Patent
Bickson et al.

(10) Patent No.: US 8,621,016 B2
(45) Date of Patent: Dec. 31, 2013

(54) ADAPTIVE DIFFERENTIAL PROPAGATION OF SOAP MESSAGES

(75) Inventors: Danny Bickson, Pittsburgh, PA (US); Han Chen, New York, NY (US); Gidon Gershinsky, Haifa (IL); Konstantin Shagin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 12/942,042

(22) Filed: Nov. 9, 2010

(65) Prior Publication Data

US 2012/0117160 A1 May 10, 2012

(51) Int. Cl.
*G06F 15/16* (2006.01)
(52) U.S. Cl.
USPC .............................. 709/206; 726/1; 709/224
(58) Field of Classification Search
USPC .......................................................... 709/206
See application file for complete search history.

(56) References Cited

U.S. PATENT DOCUMENTS

| | | | |
|---|---|---|---|
| 2004/0003343 A1 | 1/2004 | Liao et al. | |
| 2008/0256171 A1 | 10/2008 | Narayanaswami et al. | |
| 2009/0193495 A1* | 7/2009 | McAfee et al. | 726/1 |
| 2009/0300116 A1* | 12/2009 | Ramarao et al. | 709/206 |
| 2010/0131603 A1* | 5/2010 | Riemers | 709/206 |
| 2010/0332651 A1* | 12/2010 | Abdelnur et al. | 709/224 |
| 2011/0142071 A1* | 6/2011 | Farrell et al. | 370/473 |

OTHER PUBLICATIONS

Christian Werner et al., "Compressing SOAP Messages by using Differential Encoding" Web Services, IEEE International Conference on, pp. 540, IEEE International Conference on Web Services (ICWS'04), 2004.
Nayef Abu-Ghazaleh et al., "Differential Serialization for Optimized SOAP Performance," High-Performance Distributed Computing, International Symposium on, pp. 55-64, 13th IEEE International Symposium on High Performance Distributed Computing (HPDC-13 '04), 2004.
Toyotaro Suzumura et al., "Optimizing Web Services Performance by Differential Deserialization," Web Services, IEEE International Conference on, pp. 185-192, IEEE International Conference on Web Services (ICWS'05), 2005.
Khoi Anh Thi Phan, "Enhanced SOAP Performance for Low Bandwidth Environments", Source: Thesis paper, School of Computer Science and Information Technology Science, Engineering, and Technology Portfolio RMIT University, Aug. 2007.

* cited by examiner

*Primary Examiner* — Hamza Algibhah

(57) ABSTRACT

A method of adaptive differential propagation of Simple Object Access Protocol (SOAP) messages is provided herein. The method includes the following stages: classifying incoming SOAP messages according to at least one of: structure, content, and context thereof; selecting a corresponding template out of a plurality of templates for each classified SOAP message such that the selected template minimized a specified diff function applied to the classified SOAP message and the selected template; applying the specified diff function to the SOAP message and the selected template to yield a respective delta; and encapsulating a template identifier with the respective delta, wherein the template identifier is uniquely associated with the selected template, to yield an outgoing SOAP message.

23 Claims, 5 Drawing Sheets

ADAPTIVE DIFFERENTIAL PROPAGATION OF SOAP MESSAGES

BACKGROUND

1. Technical Field

The present invention relates to computer networks and more particularly, to propagation of messages over computer networks.

2. Discussion of the Related Art

In computer network communication, the size of SOAP (previously known as "Simple Object Access Protocol") messages is a well-known performance bottleneck in contemporary SOA (Service-Oriented Architecture). The existing methods of differential encoding apply to message structure rather than the content and context thereof. Consequently, they do not address the issue of message classification according to message content.

Differential serialization and de-serialization of SOAP message are also known in the art. Differential serialization and de-serialization are concerned with minimizing serialization and de-serialization latency rather than reducing the size of the SOAP message.

BRIEF SUMMARY

One aspect of the invention provides a method that includes: optionally grouping some of the incoming messages into groups; classifying incoming SOAP messages into message classes according to at least one of: structure, content, and context thereof; selecting a corresponding template from a plurality of templates or from the grouped messages, for each classified SOAP message such that the selected template minimized a product of a specified diff function applied to the classified SOAP message and the selected template/message from grouped messages; applying the specified diff function to the SOAP message and the selected template to yield a respective delta; and encapsulating, in an outgoing SOAP message, a template identifier with each respective delta or a classified SOAP message, wherein the template identifier is uniquely associated with the selected template or message from a group.

Another aspect of the invention provides a method that includes receiving delta messages or SOAP messages each having a template identifier encapsulated therein; selecting a respective template from a plurality of templates according to the template identifier; applying a reconstruction function to each received delta message and the respective template to yield a reconstructed SOAP message; adding a received SOAP messages as a new template to the plurality of templates, if the template identifier indicates that the received SOAP message is a new template; and removing a particular template from the plurality of templates whenever an identifier in a message has been specified that a specified template (e.g., on the next message) has to be removed from the database.

Other aspects of the invention may include a system arranged to execute each of the aforementioned methods, a computer network comprising a plurality of the aforementioned gateways, and a computer readable program configured to execute each of the aforementioned method or a combination thereof. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout. In the accompanying drawings.

Figure 1:
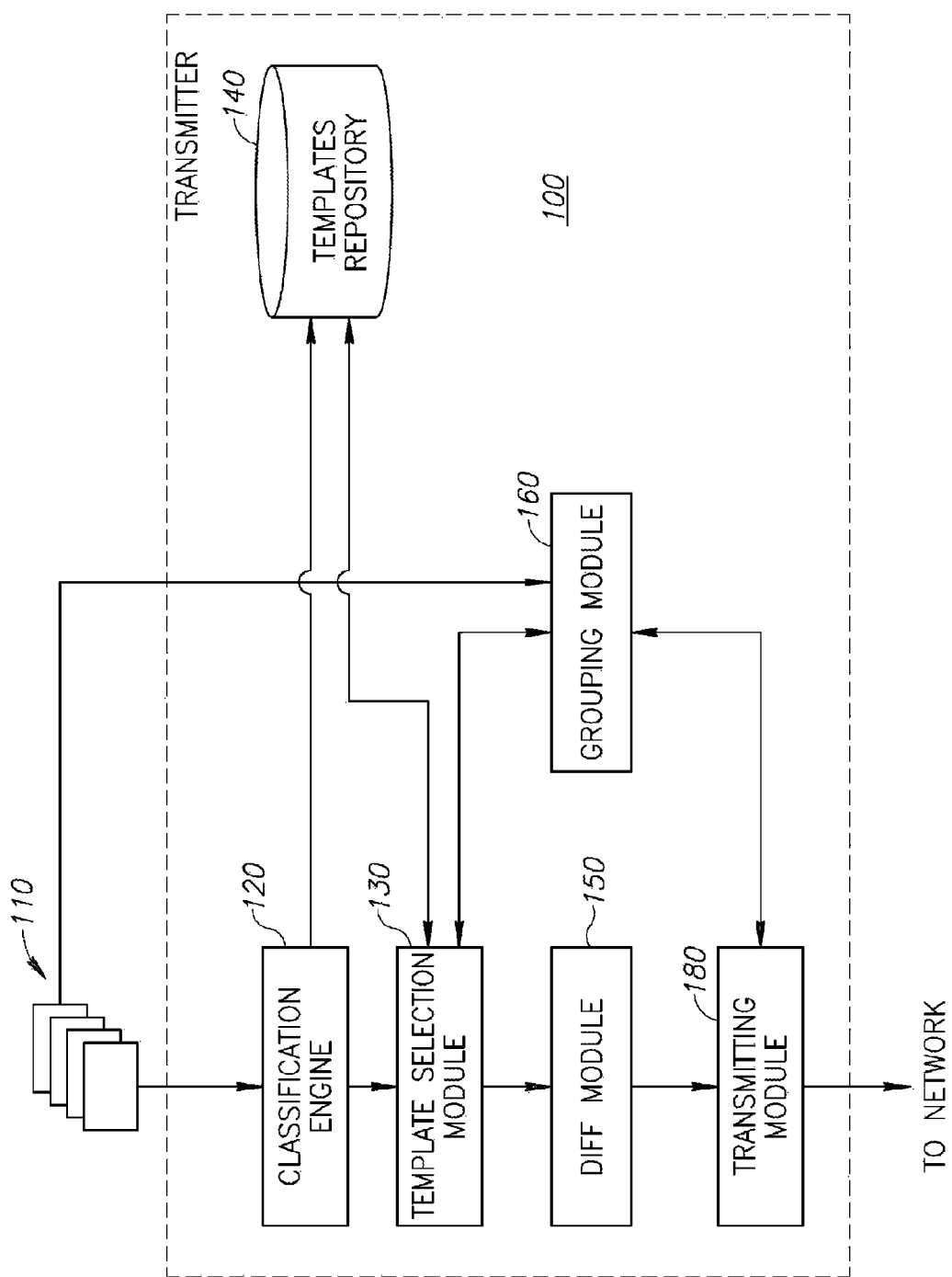
FIG. 1 is a high level schematic block diagram illustrating an aspect of a system consistent with an embodiment consistent with an embodiment of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "Extensible Markup Language" or "XML" as used herein in this application refers to a set of rules for encoding documents electronically. XML's design goals emphasize simplicity, generality, and usability over the Internet. It is a textual data format, with strong support via Unicode for the languages of the world. Although XML's design focuses on documents, it is widely used for the representation of arbitrary data structures, for example in web services.

The term "Web Services Description Language" or "WSDL" as used herein in this application refers to an XML-based language that provides a model for describing Web services. Web services are typically application programming interfaces (API) or web APIs that can be accessed over a network, such as the Internet, and executed on a remote system hosting the requested services.

The term "service-oriented architecture" or "SOA" as used herein in this application refers to a flexible set of design principles used during the phases of systems development and integration. A deployed SOA-based architecture will provide a loosely-integrated suite of services that can be used within multiple business domains. SOA also generally provides a way for consumers of services, such as web-based applications, to be aware of available SOA-based services. For example, several disparate departments within a company may develop and deploy SOA services in different implementation languages; their respective clients will benefit from a well understood, well defined interface to access them. XML is commonly used for interfacing with SOA services, though this is not required.

The term "SOAP" (previously known as "Simple Object Access Protocol") as used herein in this application refers to a protocol for Web Services in computer networks. It relies on XML as its message format, and usually relies on other Application Layer protocols (most notably Remote Procedure Call (RPC) and HTTP) for message negotiation and transmission. SOAP can form the foundation layer of a web services protocol stack, providing a basic messaging framework upon which web services can be built. This XML based protocol consists of three parts: an envelope—which defines what is in the message and how to process it—a set of encoding rules for expressing instances of application-defined data types, and a convention for representing procedure calls and responses.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Embodiments of the present invention provide a reduction in the volume of SOAP traffic by transmitting data that appears in a sequence of SOAP messages only once. This approach is referred to hereinafter as differential propagation. Advantageously, as will be shown below, differential propagation of SOAP messages in more effective in avoiding bottleneck situations in comparison to other XML compression methods specifically in contemporary SOA environments which transfer flows of messages with similar structure and content.

FIG. 1 is a high level schematic block diagram illustrating an aspect of a system consistent with an embodiment of the invention. The system may be, for example implemented as a gateway within a computer network. It is understood however, that the system may be also implemented in other manners as well, such as any form of client. Transmitter 100 includes the following elements: a classification engine 120 configured to classify incoming SOAP messages 110 into message classes; a grouping module 160 configured to group at least some of the incoming messages into groups (not shown). These groups are generated in order to find some similarity within the messages of each group (usually to temporal, location or context proximity of the messages sent in a specified timeframe). Transmitter 100 may further include a template selection module 130 configured to select a corresponding template from either a repository of templates 140 or from any of the groups generated by grouping module 160 for each classified SOAP message such that the selected template minimized a product of a specified diff function applied to the classified SOAP message and the selected template or message from a group. Transmitter 100 further includes a diff module 150 configured to apply the specified diff function to the SOAP message and the selected template/message from a group to yield a respective delta. Then, the delta is delivered to a transmitting module 180 configured to include, in an outgoing SOAP message, a template identifier with each respective delta or a classified SOAP message, wherein the template identifier is uniquely associated with the respective selected template or include alternatively an indication that the specific message is a new template (e.g., a message of a group or an incoming message that was made a template).

The grouping may be executed on at least some of the incoming messages wherein whenever a group grows beyond a specified threshold, or kept over a specified period of time it is de-grouped and messages are back to the flow of the gateway. The groups are generated so that similarities between subsequent messaged may be identified and used to generate, using diff module 150 smaller deltas that could have been generated using any of the templates from templates repository 140. Thus, one of the messages of the group becomes its template and any message of the group may be diffed with that message. Alternatively, the diffing may be performed based on one message of the group and then iteratively with subsequent messages to yield several deltas representing all the messages of that group. These detltas may be encapsulated in a single message for transmitting.

Advantageously, the aforementioned grouping technique improves the diffing in a number of ways. First, it effectively increases the number of available template messages and thus generating smaller deltas. Second it exploits the fact that in many cases time-proximity of messages reflects on their content similarity. Third, it reduces the number of message-processing interrupts. Finally, grouping potentially results in more data being transmitted in a single network packet (message) and thus it has the same positive performance effect as transport-level batching.

The classification engine 120 may classify incoming SOAP messages according to various parameters and/or information such as a structure, content, and/or a context of the message.

The template selection module 130 selects a template for each classified SOAP message. This selection is based on the results of an application of a specified diff function applied to the SOAP message and the selected template. In more detail, the module selects the template for a SOAP message that yields a minimized product of application to the SOAP message and template.

Optionally, within each of the groups generated by grouping module 160, the Dif module may be applied to any two messages of group of messages in order to yield a smaller delta. This is done instead of the diffing applied to a message and a template from the template repository. The motivation behind this process is that messages associated with the same source, timeslot, context etc, tend to exhibit similar data so that a delta generated by applying the diff module may yield smaller deltas than can be achieved using standard templates from the template repository. Such "intra-group" diffing of messages may be used effectively to generate several smaller deltas that may be used in total for reconstructing the entire groups of messages. Thus, one messages of the group may be used as a template while diffing is performed either based on the selected message of the group or by diffing iteratively each message with a consecutive message on the group.

The aforementioned diff function may be any existing diff function that on applying yields a comparison between two data entities. Specifically, a message m that is about to be transmitted by the gateway A to the gateway B is compared with a template message t known to both gateway A and gateway B. Subsequently, gateway A transmits (only) the difference between m and t, henceforth delta (m,t), to B. Upon receiving delta (m,t), gateway B reconstructs the original message m by applying the received difference to the template message t.

In operation, the various modules of the gateway 100 respectively classify an incoming SOAP message into one of plural message classes; select one of a plurality of templates for the classified SOAP message; apply the specified diff function to the classified SOAP message and the selected template to yield a delta; and include, with the respective delta or classified SOAP message, in an outgoing SOAP message.

It is understood that the aforementioned logic implemented on gateway 100 may be implemented, with the necessary changes, on a single client running one or more applications sending SOAP messages. Similarly, it may be implemented in other network architectures and is not limited in scope to the aforementioned gateway embodiment.

Figure 2:
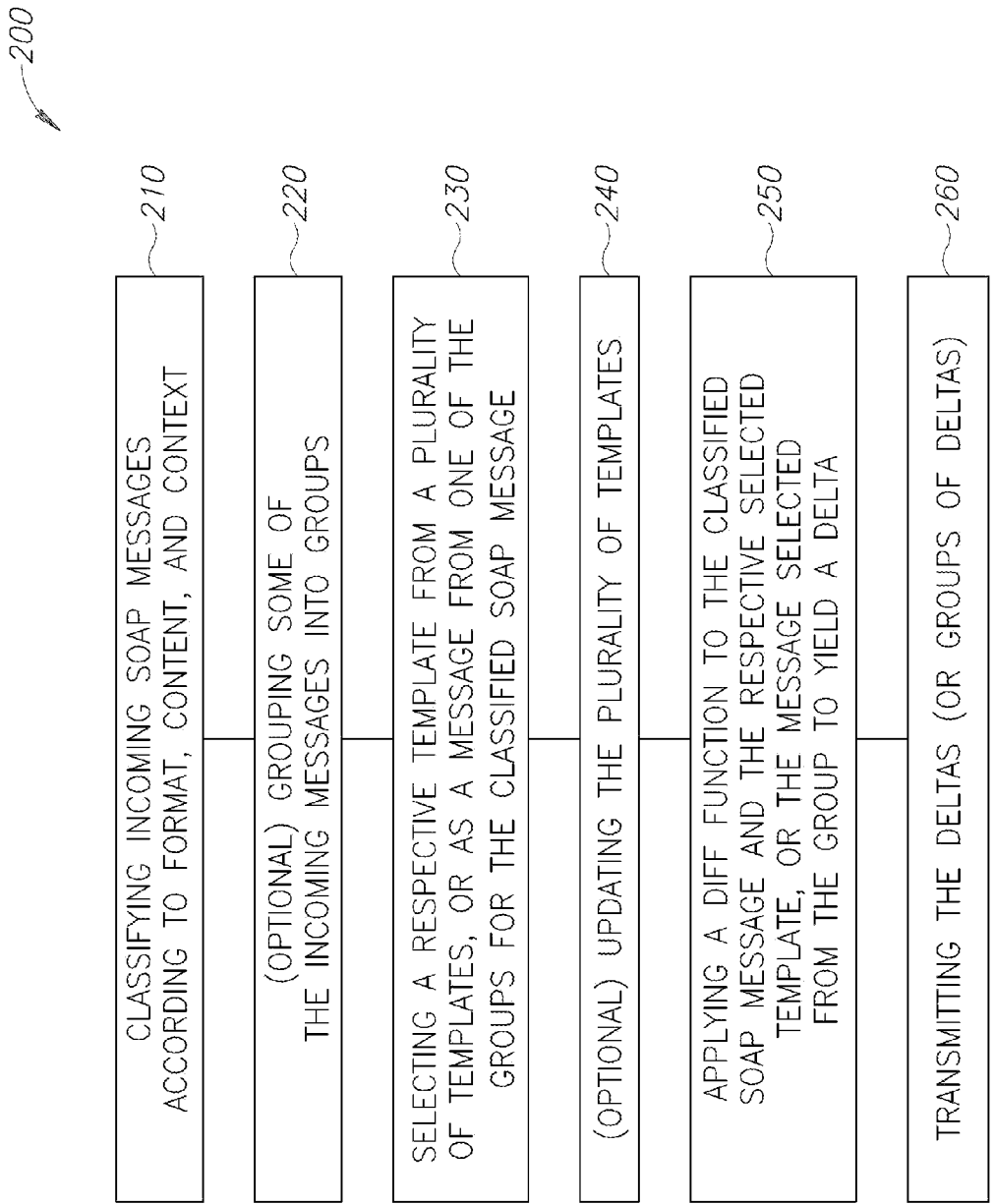
FIG. 2 is a high level flowchart diagram illustrating an aspect of a method consistent with an embodiment of the invention.

FIG. 2 is a high level flowchart diagram illustrating an aspect of a method consistent with an embodiment of the invention. Method 200 includes: classifying incoming SOAP messages into message classes according to at least one of: structure, content, and context thereof 210; (optionally) grouping some of the incoming messages into groups 220; selecting a corresponding template from either (i) a plurality of templates, or as (ii) a message from one of the groups, for each classified SOAP message such that the selected template minimizes a product of a specified diff function applied to the classified SOAP message and the selected template 230; (optionally) updating the plurality of templates 240; applying the specified diff function to the SOAP message and the selected template or the message from the group to yield a respective delta 250; and encapsulating for transmitting, in an outgoing SOAP message, a template identifier with each respective delta or a classified SOAP message, wherein the template identifier is uniquely associated with the selected template 260.

Consistent with an embodiment of the invention, classification engine 120 or classifying 110 may be executed at run time based on structure (format), context (from where, to where, and when a given message goes), and content of a given message. Each message class has at least one template message. Initially, messages are divided into classes based on the Web Services Description Language (WSDL) message definition. At run time, the existing classes may be divided or merged.

Consistent with an embodiment of the invention, an entire message can be transmitted (rather than its delta). This is most likely to occur in the beginning of system operation, when there are no available template messages. It can also happen if the system determines that there is no significant gain from differential propagation.

Consistent with an embodiment of the invention, message classification may be implemented by clustering techniques. Specifically, the message classes may be defined over a specified messages space. A class may be defined by the following message parameters, being exemplary dimensions of the messages space: (i) source address (ii) destination address, (iii) existence or content of a SOAP header, (iv) existence or content of a SOAP body construct, or (v) any combination of the previous parameters. For example, all messages originating at a certain set of clients may be defined to be a separate class. In classifying, classification engine 120 may apply known clustering techniques over the messages space to associate a specific message to a predefined cluster, thus facilitating the classification process.

Consistent with some embodiments of the invention, the trigger for dividing a class may be a delta size exceeding the average or a certain limit. Periodically, the classification engine compares messages belonging to different classes. If the delta is small enough, the classes become candidates for merging. This option is further verified by comparing addition messages belonging to these classes.

The average size and the average frequency of messages that pertain to the same WSDL message definition and the same class are monitored. If the average message size is small while the average frequency is low, then no differential propagation techniques are applied. If the average frequency is below a certain threshold, the grouping technique is not performed in order to prevent increase in message latency as a result of delaying the message in waiting for additional similar messages to arrive Consistent with an embodiment of the invention, existing diff techniques may be employed. However, to achieve a more compact representation of the delta message there is provided a technique for building a canonical mapping between XML construct names and binary labels. The canonical mapping is derived from the message description found in WSDL, which is known to both the Transmitter and the Receiver. When serializing the delta, the source substitutes construct names with the corresponding binary labels. In addition, if the difference message is itself an XML document, its size can be reduced using the same binary encoding method.

Consistent with an embodiment of the invention, the average size and the average frequency of messages associated with the same WSDL message definition and the same class are monitored. If the average message size is below a specified first value while the average frequency is below a specified second value, then no differential propagation techniques are applied. If the average frequency is below a certain threshold, the grouping technique is not performed in order to prevent increase in message latency as a result of delaying the message in waiting for additional similar messages to arrive. Advantageously, these embodiments allow improving both the compression rates and further reduce the computational intensity thus reducing CPU usage.

Figure 3:
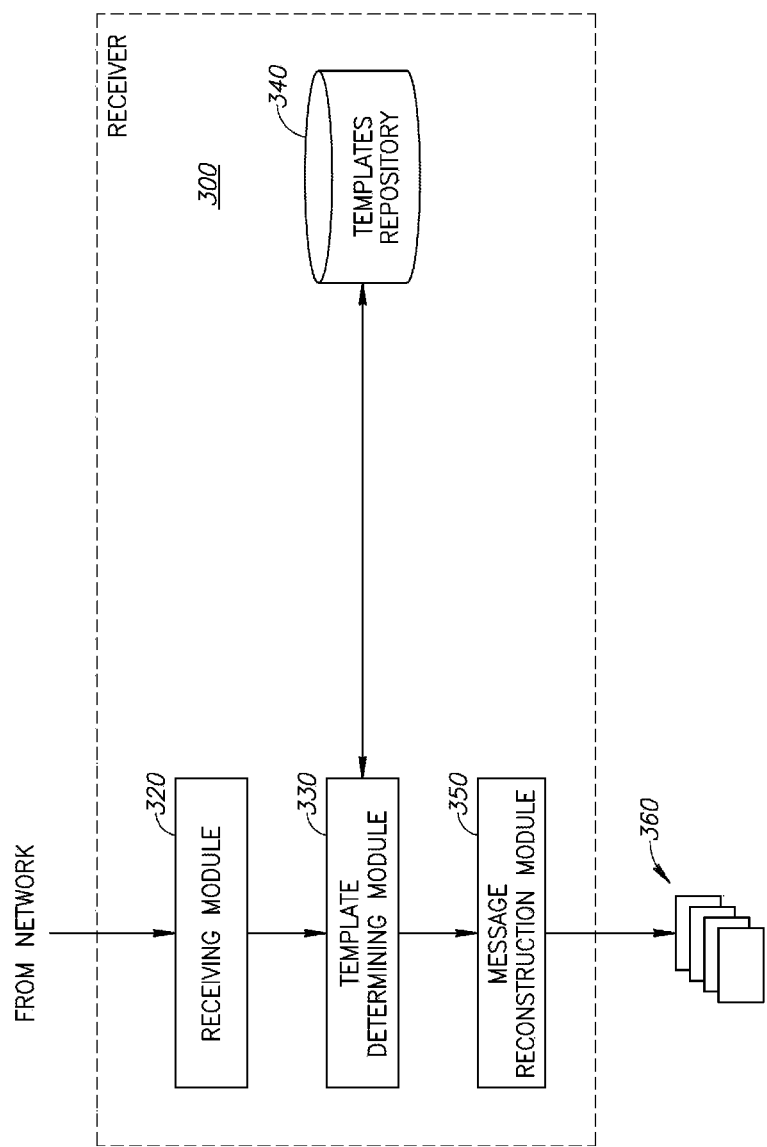
FIG. 3 is a high level schematic block diagram illustrating an aspect of a system consistent with an embodiment of the invention.

FIG. 3 is a high level schematic block diagram illustrating embodiment of the invention implemented as a Receiver 300. Receiver 300 includes a receiving module 320; a template determining module 330 in operative association with a templates repository 340; and a message reconstruction module 350.

In operation, receiving module 320 is configured to receive deltas s or SOAP messages having a template identifier encapsulated therein. Template determining module 330 may be configured to select a respective template from a plurality of templates stored on templates repository 340 according to the template identifier. Message reconstruction module 350 may be configured to apply a reconstruction function to each received deltas message and the respective template to yield a reconstructed SOAP message.

In addition to the aforementioned operation of Receiver 300 and consistent with the embodiments of the invention, Receiver 300 is configured to add a received SOAP messages as a new template to the plurality of templates, whenever the template identifier on the received SOAP message indicates that the received SOAP message is a new template. Similarly, it removes a particular template from the plurality of templates in response to an explicit request of the sender (e.g., Transmitter 100) by identifying, for example, a next message as a template that should be removed. Thus, template repository 340 in receiver 300 is being constantly updated so that it complies with template repository 140 in transmitter 100.

Figure 4:
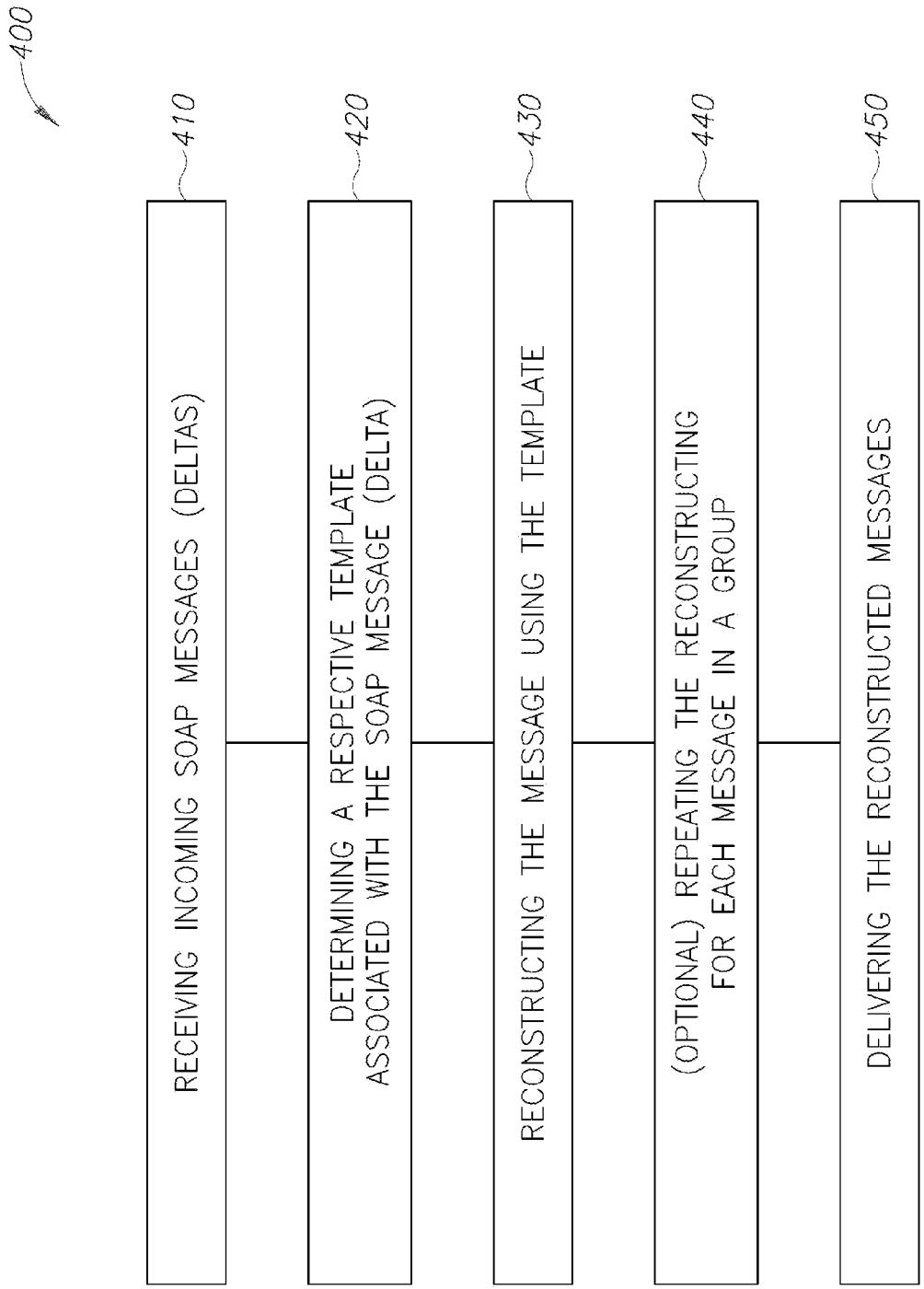
FIG. 4 is a high level flowchart diagram illustrating an aspect of a method consistent with an embodiment of the invention.

FIG. 4 is a high level flowchart diagram illustrating a method consistent with an embodiment of the invention; Method 400 provides a method that includes receiving deltas or SOAP messages having a template identifier encapsulated therein 410; determining a respective template from a plurality of templates according to the template identifier 420 associated with any given received message; applying a reconstruction function to each received deltas and the respective template to yield a reconstructed SOAP message 430; in case that a received message is a group of deltas, repeating the reconstructing for each message in a group 440. Alternatively, a message can be reconstructed using another grouped message rather than via a template. Finally, method 400 is finalized with delivering the reconstructed messages 450.

In addition to the aforementioned operation of method 400 and consistent with embodiments of the invention, method 400 further includes the step of adding a received SOAP message as a new template to the plurality of templates, if the template identifier indicates that the received SOAP message is a new template; Similarly, method 400 includes the step of removing a particular template from the plurality of templates in response to an explicit request of the sender by identifying, for example, a next message as a template that should be removed. These two steps are essential for updating the repository of templates in the receiver (e.g., Receiver 300) and for verifying that the templates on the receiver comply with the templates used in the sender (e.g., transmitter 100).

Consistent with an embodiment of the invention, there is provided a further improvement for producing compact deltas. As explained above, any existing diff technique may be employed for comparing XML messages (applying a diff function 250) and later reconstructing them based on the delta (reconstructing 430). Non limiting examples may be: xmldiff, diffxml, 4xupdate, and the like. However, since the deltas produced by most utilities contain the names of the original message constructs and the names of their attributes, there is provided a replacing thereof with short binary labels in order to reduce the delta size. The XML schema of the SOAP message is known to both the sender (Transmitter 100) and the receiver (Receiver 300) as defined in WSDL definition. Therefore, both sides can determine the exact set of constructs and attributes that can appear in the message. The mapping of construct and attribute names to binary labels may be produced as follows: the construct names are sorted alphabetically. An index is assigned to each name according to its place in the sorted list. The value of the index serves as the binary label. The same algorithm is applied to the attribute names. For simpler message types a single byte is sufficient to hold the binary labels. More complex types may require two bytes. Note, however that both sides can determine the required label size. If the delta message is also an XML document, the same technique may be applied to the delta constructs and attributes.

Figure 5:
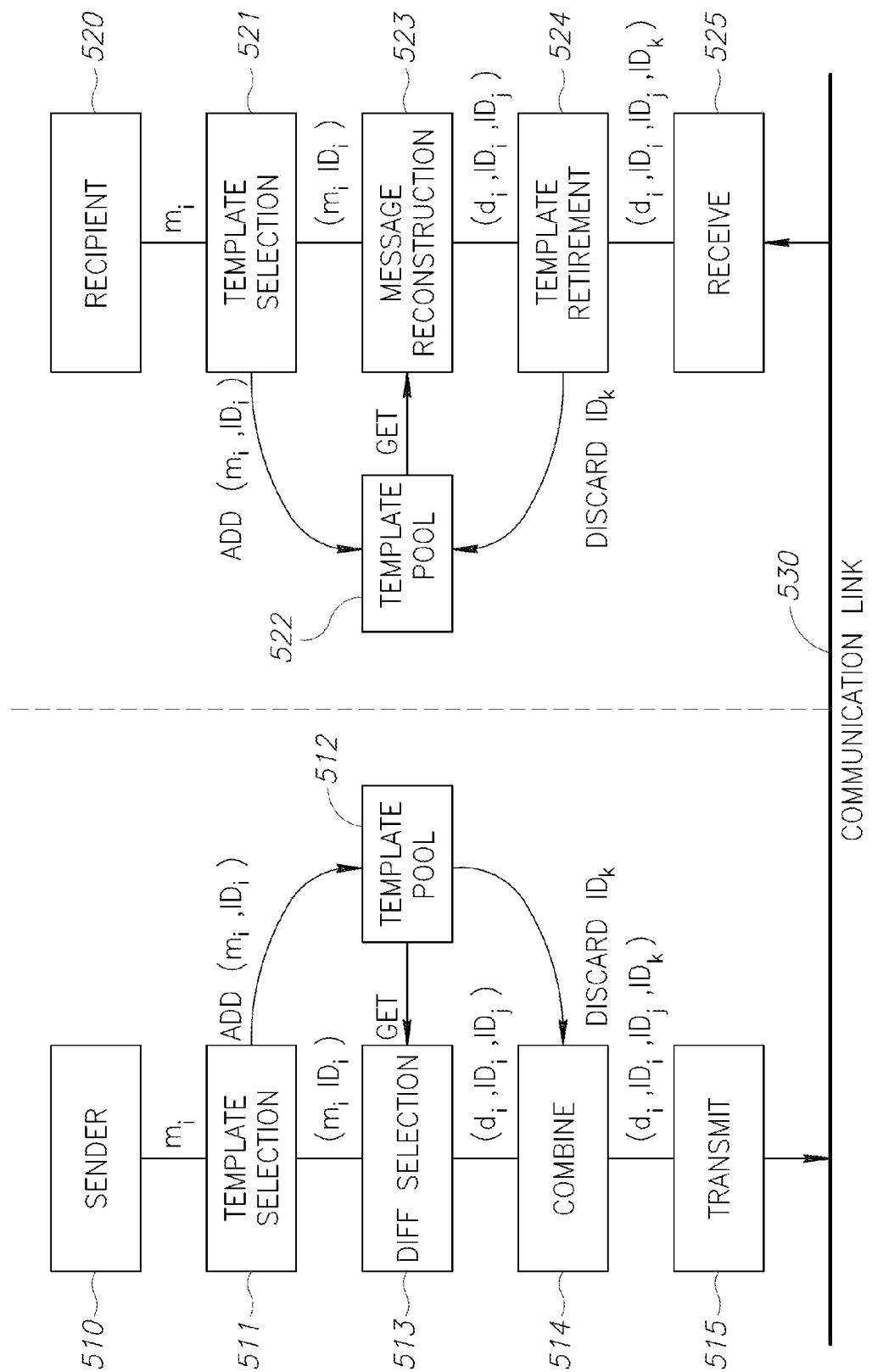
FIG. 5 is a high level dataflow diagram illustrating an aspect relating to some embodiments of the invention.

FIG. 5 is a high level dataflow diagram illustrating a comprehensive view of the aforementioned differential propagation mechanism of SOAP messages, showing propagation of template IDs along with respective deltas in a computer network. As detailed above, sender 510 conveys message $m_i$ to template selection 511. In template selection 511, a new template $ID_i$ may be added to template pool 512. Diff selection 513 may, in cooperation with template pool 512 generate a delta (diff) $d_i$ associated with newly created new template $ID_i$ and a reference template $ID_j$. The delta and the template IDs are combined in combine 514 where, in case a specific template is discarded in template pool 512, the ID of the discarded template, such as $ID_k$ is added to the combined message that is transmitted by transmit 515 into the communication link 530.

Upon receiving the transmitted messages in receive 525, messages are reconstructed in message reconstruction 523 in cooperation with template pool 522. A discard template ID in the message such as $ID_k$ leads to template retirement 524 which updates template pool 522 by removing the template associated with $ID_k$ from template pool 522, while new template ID in the incoming message such as $ID_i$ leads in template selection 521 to adding a new template to template pool 522. Finally, the reconstructed message is conveyed to recipient 520.

On a different perspective, embodiments of the invention enable to provide a sender (gateway A) with the means for adaptive choice of the template message t for a given message m and in (ii) providing the receiver (gateway B) with means to determine the template message that was used to produce the received difference. Both features are implemented by attaching compact metadata to the (application) messages transmitted by the source to the destination. The metadata indicates that the current message will be used as a template message in the future and specifies its logical name. In order to reconstruct the original message from the received delta, the destination must be able to identify the template message and ensure it is cached. In addition it should be able to discard template messages that are no longer used by the source.

The above functionality is implemented by attaching metadata to the messages sent by the source and propagated over the network as illustrated, for example, in FIG. 5. The metadata (template ID) can be encapsulated in a dedicated SOAP header or the preamble of a delta construct.

The following are exemplary template ID that may be used in embodiments of the inventions. In order to indicate that a certain message (or delta) is a template, the source attaches a NEW_TEMPLATE construct to it. The construct contains the ID of the template, which is an integer that is derived from the counter of template messages on the sender side. Each delta produced using a template message contains the ID of the latter. When the source decides to discard a template message it attaches the TEMPLATE_DISCARDED construct to the next message or delta transmitted to the destination. This construct contains the ID of the discarded message. If the destination is unable to cache the new template message due to space limitations, it sends a notification message to the source. If possible, the destination should discard the template only after the notification is acknowledged by the source.

Advantageously, embodiments of the present invention may be applied effectively to the federated enterprise service buses market. Given two autonomous domains interconnected by a low-bandwidth link, service requestors in one domain invoke Web Services hosted by service providers in the other domain. In order to reduce the bandwidth utilization of the inter-domain link, implementation of the current invention can be incorporated in the gateway proxies located in both domains. This approach allows (domain-wide) classification of all outgoing SOAP messages which potentially achieves more compact differential representation. In addition, it makes differential propagation transparent to service requestors and service providers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
   classifying Simple Object Access Protocol (SOAP) messages originating within a first gateway, into message classes according to at least one of: a structure, content, and a context thereof;
   selecting one of a plurality of templates for each classified SOAP message, each selected template yielding a minimized product of a diff function applied to the selected template and the classified SOAP message for which it is selected, wherein the selected template of the first gateway and a second gateway comply;
   applying a diff function to each selected template and the classified SOAP message for which it is selected to yield respective deltas;
   encapsulating, in at least one outgoing SOAP message, a template identifier or a classified SOAP message with each respective delta, the template identifier being uniquely associated with the selected template; and
   transmitting the at least one encapsulated outgoing SOAP message to a communication link in communication with the second gateway;
   wherein at least one of the classifying, the selecting, the applying, the encapsulating, and the transmitting is executed by at least one processor.

2. The method according to claim 1, wherein at least one of the plurality of the templates is associated with at least one of the message classes, and wherein the method further comprising periodically increasing or decreasing a number of templates per classes when an average value of the product of a specified diff function applied to a plurality of classified SOAP messages and a plurality of respective selected templates is above or below a specified value.

3. The method according to claim 1, further comprising adding a new template to the plurality of templates, when the product of the specified diff function applied to a particular classified SOAP message and any one of the plurality of templates exceeds a specified level, wherein the new template is associated with the particular classified SOAP message, and wherein in the encapsulating, the template identifier comprises an indication that the template is a new and further is the classified SOAP message.

4. The method according to claim 1, wherein, in the encapsulating, at least one of constructs and attributes of the incoming messages are mapped into respective binary labels based on Web Services Description Language (WSDL) formatting, such that the respective binary label is an index value of the constructs and the attributes respectively, when ordered in an alphabetical order.

5. The method according to claim 1, further comprising grouping a plurality of SOAP messages to yield groups, wherein the selecting one of a plurality of templates for each classified SOAP message, is of a message from any one of the group such that the selected message yields a minimized product of a diff function applied to the selected message of the group and the classified SOAP message for which it is selected.

6. The method according to claim 5, wherein the grouping ceases and deltas grouped thus far are associated into the outgoing message, if a memory space associated with the grouping exceeds a specified value or when a timeframe associated with the grouping exceeds a specified value.

7. The method according to claim 5, further comprising generating a plurality of deltas by applying the diff function iteratively on pairs of messages of a given group, wherein the plurality of deltas are encapsulated into an out coming message.

8. A computer system comprising:
   a first gateway comprising a non-transitory memory having stored thereon:
      a classification engine module for classifying incoming Simple Object Access Protocol (SOAP) messages originating within the first gateway into message classes according to at least one of: a structure, content, and a context thereof;
      a template selection module for selecting one of a plurality of templates for each classified SOAP message, each selected template yielding a minimized product of a diff function applied to the selected template and the classified SOAP message for which it is selected, wherein the selected template of the first gateway and a second gateway comply;

a diff module for applying a diff function to each selected template and the classified the SOAP message for which it is selected to yield respective deltas;

a module for encapsulating, in at least one outgoing SOAP message, a template identifier or a classified SOAP message with each respective delta, the template identifier being uniquely associated with the selected template; and a module for transmitting the at least one encapsulated outgoing SOAP message to a communication link in communication with the second gateway.

9. The system according to claim 8, wherein at least one of the plurality of the templates is associated with at least one of the message classes, wherein the templates selection module is further configured to periodically increase or decrease the number of templates per classes when an average value of the product of a specified diff function applied to a plurality of classified SOAP message and a plurality of respective selected templates is above or below a specified value, respectively.

10. The method according to claim 8, wherein the first gateway is further configured to add a new template to the templates repository, if the product of the specified diff function applied to a particular classified SOAP message and any one of the plurality of templates exceeds a specified level, wherein the new template is associated with the particular classified SOAP message and wherein in the encapsulating, the template identifier comprises an indication that the template is a new and further is the classified SOAP message.

11. The system according to claim 8, wherein the first gateway is further configured to remove an existing template from the templates repository, responsive to a specified template identifier indicative of a future message as a template to be removed, and wherein the encapsulating module is further configured to include in the template identifier an indication that a removed template needs to be removed.

12. The system according to claim 8, wherein the encapsulating module is configured to map, at least one of the constructs and attributes of the incoming messages into respective binary labels, such that the respective binary label is an index value of the constructs and the attributes respectively, when ordered in an alphabetical order.

13. The system according to claim 8, wherein the first gateway further comprises a grouping module configured to group a plurality of SOAP messages to yield groups, wherein the selecting one of a plurality of templates for each classified SOAP message, is of a message from any one of the group such that the selected message yields a minimized product of a diff function applied to the selected message of the group and the classified SOAP message for which it is selected.

14. The system according to claim 12, wherein the diff module is further configured to generate a plurality of deltas by applying the diff function iteratively on pairs of messages of a given group, wherein the plurality of deltas are encapsulated into an out coming message.

15. The system according to claim 8, wherein the second gateway is further configured to:
receive deltas messages or SOAP messages each having a template identifier encapsulated therein;
select a respective template from a plurality of templates according to the template identifier;
apply a reconstruction function to each received deltas message and the respective template to yield a reconstructed SOAP message; and
add a received SOAP message as a new template to the plurality of templates, if the template identifier indicates that the received SOAP message is a new template.

16. The system according to claim 15, wherein the second gateway further comprises a de-grouping module configured to de-group deltas grouped together in a received message, to yield a plurality of SOAP messages.

17. The system according to claim 15, wherein the reconstruction function is further applied to binary labels encapsulated within the received deltas message or the received SOAP messages, to yield respective constructs and the attributes associated with SOAP messages according to which the received deltas message or the received SOAP messages are based.

18. A computer program product, the computer program product comprising:
a non-transitory computer readable storage medium having computer readable program embodied therewith, the computer readable program comprising:
computer readable program configured to classify incoming Simple Object Access Protocol (SOAP) messages originating within a first gateway, into message classes according to at least one of: structure, content, and context thereof;
computer readable program configured to select a corresponding template from a plurality of templates for each classified SOAP message such that the selected template minimized a product of a specified diff function applied to the classified SOAP message and the selected template, wherein the selected template of the first gateway and a second gateway comply;
computer readable program configured to apply the specified diff function to the SOAP message and the selected template to yield a respective delta;
computer readable program configured to encapsulate, in an outgoing SOAP message, a template identifier with each respective delta or a classified SOAP message, wherein the template identifier is uniquely associated with the selected template; and
computer readable program configured to transmit the at least one encapsulated outgoing SOAP message to a communication link in communication with the second gateway.

19. The computer program product according to claim 18, wherein at least one of the plurality of the templates is associated with at least one of the message classes, wherein the computer program product further comprises computer readable program configured to periodically increase or decrease the number of templates per classes when an average value of the product of a specified diff function applied to a plurality of classified SOAP message and a plurality of respective selected templates is above or below a specified value, respectively.

20. The computer program product according to claim 18, further comprising computer readable program configured to add a new template to the plurality of templates, if the product of the specified diff function applied to a particular classified SOAP message and any one of the plurality of templates exceeds a specified level, wherein the new template is associated with the particular classified SOAP message and wherein in the encapsulating, the template identifier comprises an indication that the template is a new and further is the classified SOAP message.

21. The computer program product according to claim 18, further comprising computer readable program configured to group a plurality of SOAP messages to yield groups, wherein the selecting of one of a plurality of templates for each classified SOAP message, is of a message from any one of the group such that the selected message yields a minimized product of a diff function applied to the selected message of the group and the classified SOAP message for which it is selected.

22. The computer program product according to claim 18, further comprising:
- computer readable program configured to receive the outgoing SOAP messages;
- computer readable program configured to select a respective template from a plurality of templates according to the template identifier; and
- computer readable program configured to apply a reconstruction function to each received deltas message and the respective template to yield a reconstructed SOAP message.

23. The method according to claim 1, further comprising updating a template repository of the second gateway receiver so that the template repository of the receiver complies with a template repository of the first gateway transmitter.

\* \* \* \* \*